United States Patent
Judd et al.

(10) Patent No.: US 10,742,843 B2
(45) Date of Patent: Aug. 11, 2020

(54) ELECTRONIC DEVICE AND IMAGE FORMING APPARATUS THAT TAKE SCREENSHOT OF IMAGE BEING DISPLAYED ON DISPLAY TO THEREBY ACQUIRE THE IMAGE

(71) Applicant: KYOCERA Document Solutions Inc., Osaka (JP)

(72) Inventors: Isaac Judd, Osaka (JP); Shoichi Sakaguchi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/511,537

(22) Filed: Jul. 15, 2019

(65) Prior Publication Data
US 2020/0036863 A1    Jan. 30, 2020

(30) Foreign Application Priority Data

Jul. 27, 2018    (JP) .................... 2018-141792

(51) Int. Cl.
| H04N 1/00 | (2006.01) |
| H04N 1/44 | (2006.01) |
| G06F 3/12 | (2006.01) |
| G06K 15/02 | (2006.01) |

(52) U.S. Cl.
CPC ......... *H04N 1/444* (2013.01); *H04N 1/00249* (2013.01); *H04N 1/00331* (2013.01); *H04N 1/00384* (2013.01); *H04N 1/00925* (2013.01); *H04N 2201/0094* (2013.01)

(58) Field of Classification Search
None
See application file for complete search history.

(56) References Cited

U.S. PATENT DOCUMENTS

| 6,731,756 B1 * | 5/2004 | Pizano | H04N 7/163 348/E7.061 |
| 9,582,482 B1 * | 2/2017 | Sharifi | H04W 4/18 |
| 2002/0174010 A1 * | 11/2002 | Rice, III | G06Q 30/02 705/14.67 |
| 2006/0039037 A1 * | 2/2006 | Shibata | H04N 1/00 358/426.01 |
| 2012/0079599 A1 * | 3/2012 | Matsune | G06F 21/51 726/26 |

(Continued)

FOREIGN PATENT DOCUMENTS

JP    2017-204191 A    11/2017

*Primary Examiner* — Beniyam Menberu
(74) *Attorney, Agent, or Firm* — IP Business Solutions, LLC (57) ABSTRACT

An electronic device includes a display and a control unit. The control unit includes a processor and functions, when the processor executes a control program, as a screenshot executing section and a control section. The screenshot executing section acquires an image being displayed on the display. The control section performs authentication processing authenticating a user. When an image that requires authentication of the user is being displayed on the display, the control section forbids the screenshot executing section to acquire the image. When an image that requires no authentication of the user is being displayed on the display, the control section permits the screenshot executing section to acquire the image.

6 Claims, 10 Drawing Sheets

(56) References Cited

U.S. PATENT DOCUMENTS

| | | | |
|---|---|---|---|
| 2013/0247220 A1* | 9/2013 | Bingell | H04L 63/0428 |
| | | | 726/28 |
| 2016/0292428 A1* | 10/2016 | Brady | G06F 21/10 |
| 2018/0107580 A1* | 4/2018 | Zhang | G06K 9/00442 |
| 2018/0113660 A1* | 4/2018 | Su | H04N 1/00411 |
| 2018/0121637 A1* | 5/2018 | Sambamurthy | G06F 21/31 |

* cited by examiner

| IMAGE | IDENTIFICATION INFORMATION ID OF USER | COORDINATE POSITION OF EXTRACTION AREA |
|---|---|---|
| Z1 | AAA1111 | - |
| Z2 | - | - |
| Z3 | DDD8888 | - |
| Z4 | - | (x1,y1) (x2,y2) (x3,y3) ... |
| ... | ... | ... |

ELECTRONIC DEVICE AND IMAGE FORMING APPARATUS THAT TAKE SCREENSHOT OF IMAGE BEING DISPLAYED ON DISPLAY TO THEREBY ACQUIRE THE IMAGE

INCORPORATION BY REFERENCE

This application claims priority to Japanese Patent Application No. 2018-141792 filed on Jul. 27, 2018, the entire contents of which are incorporated by reference herein.

BACKGROUND

The present disclosure relates to an electronic device and an image forming apparatus that take a screenshot of an image being displayed on a display to thereby acquire the image. Particularly, the disclosure relates to a technique for restricting acquisition of an image by screenshot taking.

There are electronic devices (e.g. smart phones and information processing devices) equipped with functions for acquiring images being displayed on displays, by taking screenshots of the images. For example, when images are acquired by screenshot executing sections under predetermined conditions and are stored into storage sections, conventional information processing devices cause near field communication sections to transmit the images to image forming apparatuses.

SUMMARY

A technique improved over the aforementioned technique is proposed as one aspect of the present disclosure.

An electronic device according to one aspect of the present disclosure includes a display and a control unit. The control unit includes a processor and functioning, when the processor executes a control program, as a screenshot executing section and a control section. The screenshot executing section acquires an image being displayed on the display. The control section performs authentication processing authenticating a user. When an image that requires authentication of the user is being displayed on the display, the control section forbids the screenshot executing section to acquire the image, and when an image that requires no authentication of the user is being displayed on the display, the control section permits the screenshot executing section to acquire the image.

An image forming apparatus according to another aspect of the present disclosure includes the above-described electronic device and an image forming unit performing image formation on a recording sheet, wherein the control section causes the image forming unit to form the image acquired by the screenshot executing section on the recording sheet.

DETAILED DESCRIPTION

Figure 1:
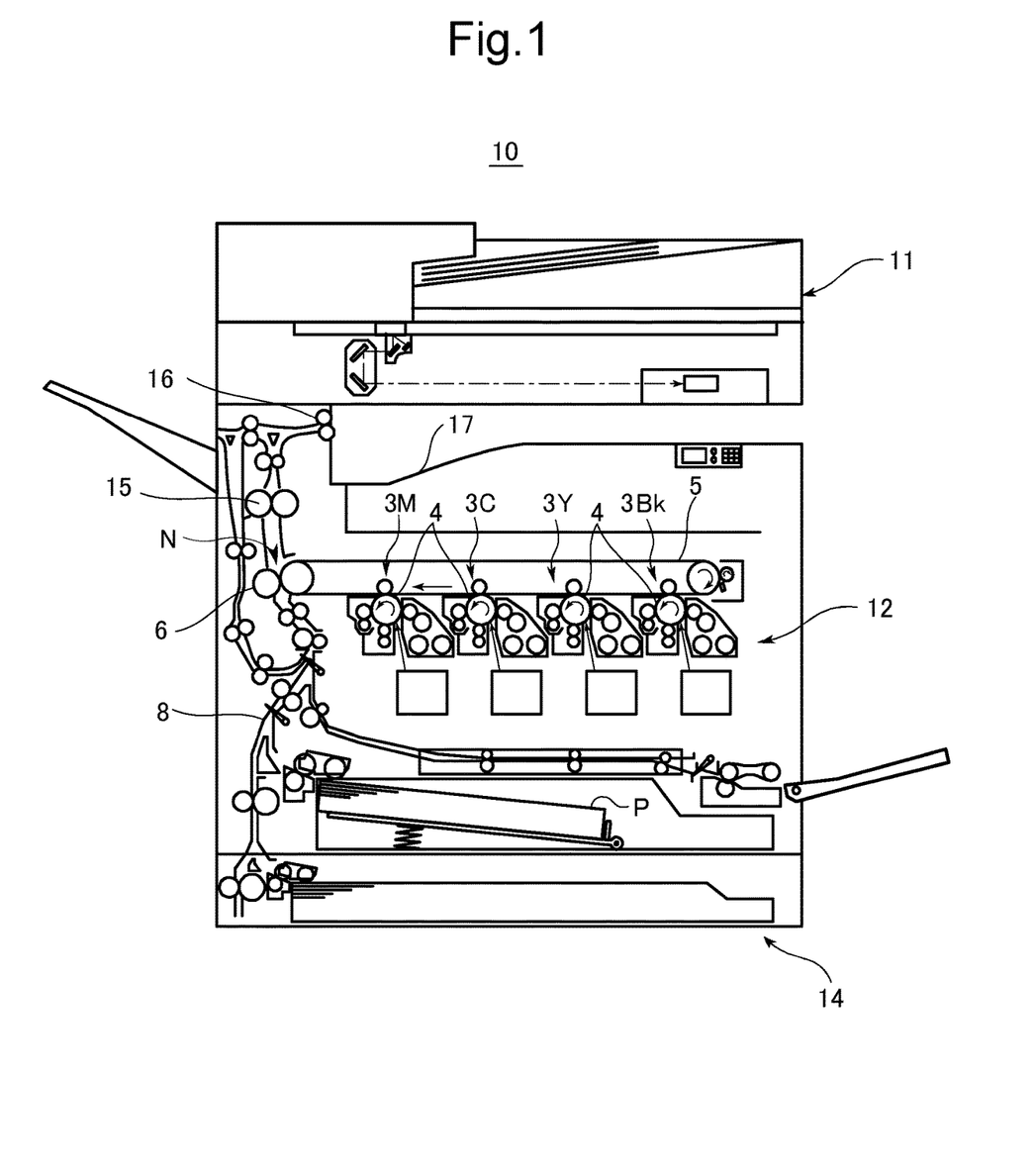
FIG. 1 is a cross-sectional view showing an image forming apparatus that is an example of an electronic apparatus according to an embodiment of the present disclosure.

Hereinafter, a description will be given of an embodiment of the present disclosure with reference to the drawings. FIG. 1 is a cross-sectional view showing an image forming apparatus that is an example of an electronic apparatus according to the one embodiment of the present disclosure. The image forming apparatus 10 of the present embodiment is a multi-function peripheral (MFP) having multiple functions, including a copy function, a print function, and a scan function. The image forming apparatus 10 includes an image reading unit 11 and an image forming unit 12.

The image reading unit 11 has an image sensor element that optically reads an image of a document. Analog output of the image sensor element is converted to a digital signal to generate image data representing the image of the document.

The image forming unit 12 is a unit that forms on a recording sheet the image represented by the aforesaid image data and that includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges a surface of a photosensitive drum 4, exposes the surface of the photosensitive drum 4 to light to form an electrostatic latent image on the surface of the photosensitive drum 4, develops the electrostatic latent image formed on the surface of the photosensitive drum 4 into a toner image, and primarily transfers the toner image on the surface of the photosensitive drum 4 to an intermediate transfer belt 5. Thus, a multicolor toner image is formed on the intermediate transfer belt 5. This multicolor toner image is secondarily transferred, at a nip region N between the intermediate transfer belt 5 and a secondary transfer roller 6, to a recording sheet P conveyed from a sheet feed section 14 via a conveyance path 8.

Thereafter, heat and pressure are applied to the recording sheet P by a fixing device 15, so that the toner image on the recording sheet P is fixed by heat and pressure. Then, the recording sheet P is discharged through an ejection roller 16 to a sheet output tray 17.

Figure 2:
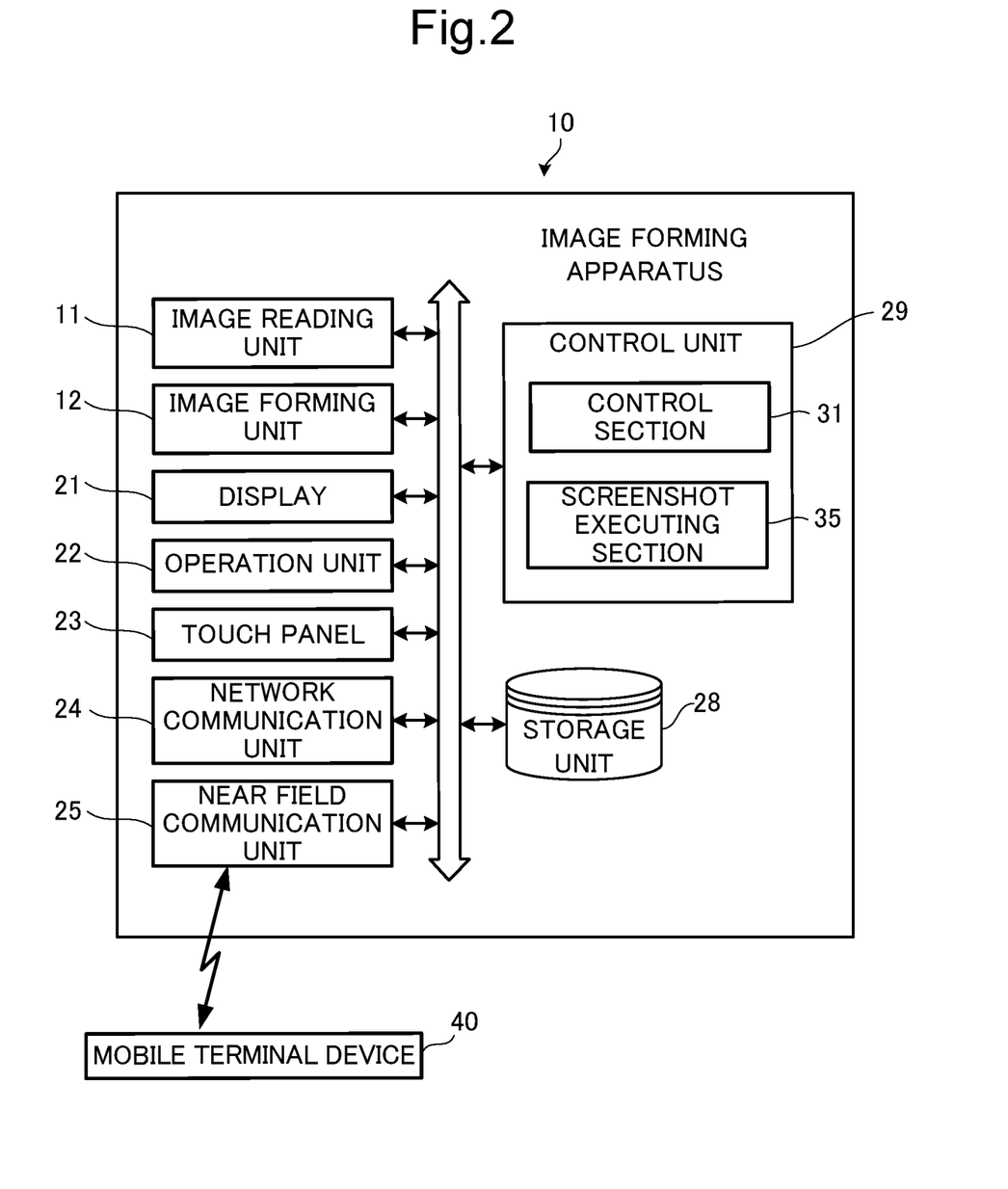
FIG. 2 is a block diagram showing an essential internal configuration of the image forming apparatus according to the one embodiment.

Next, a description will be given of a configuration related to the control of the image forming apparatus 10. FIG. 2 is a functional block diagram showing an essential internal configuration of the image forming apparatus 10. As shown in FIG. 2, the image forming apparatus 10 includes the image reading unit 11, the image forming unit 12, a display 21, an operation unit 22, a touch panel 23, a network communication unit 24, a near field communication unit 25, a storage unit 28, and a control unit 29. These components can transfer data or signals to and from one another via a bus.

The display 21 is a display device formed of a liquid crystal display (LCD), an organic electro-luminescence (OLED: Organic Light-Emitting Diode) display or the like. The operation unit 22 includes physical keys such as numeric keys, an Enter key, and a Start key.

The display 21 is provided with the touch panel 23 disposed on a screen thereof. The touch panel 23 is a touch panel of, for example, a so-called resistive film type or electrostatic capacitance type, and detects a user's touch, for example by a finger, together with its touched position, and upon detecting the touch, the touch panel 23 outputs a detection signal indicating the coordinates of the touched position to, for example, a control section 31 (to be described later) of the control unit 29.

The network communication unit (NW communication unit) 24 is a communication interface having a communication module such as an un-illustrated LAN chip. The image forming apparatus 10 is connected via the network communication unit 24 to other terminal devices, such as a personal computer (PC) and the server that are on a network, to exchange data with the PC and the server. The network communication unit 24 is an example of the communication unit recited in WHAT IS CLAIMED IS.

The near field communication unit 25 is a communication interface by a short-range communication method such as Bluetooth (registered trademark), Wi-Fi, and near field communication (NFC). The image forming apparatus 10 is connected via the near field communication unit (NFC communication unit) 25 to, for example, a mobile terminal device 40 and exchange data with the mobile terminal device 40. The near field communication unit 25 is an example of the communication unit recited in WHAT IS CLAIMED IS.

The storage unit 28 is a large-capacity storage device such as a solid state drive (SSD) and a hard disk drive (HDD), and stores, for example, various application programs and various kinds of data.

The control unit 29 includes, for example, a processor, a random access memory (RAM), and a read only memory (ROM). Examples of the processor include a central processing unit (CPU), an application specific integrated circuit (ASIC), and a micro processing unit (MPU). The control unit 29 functions as the control section 31 and a screenshot executing section 35 when a control program stored in the ROM or the storage unit 28 is executed by the processor.

The control section 31 governs overall operation control of the image forming apparatus 10. The control unit 29 is connected to the image reading unit 11, the image forming unit 12, the display 21, the operation unit 22, the touch panel 23, the network communication unit 24, the near field communication unit 25, and the storage unit 28. The control section 31 performs the operation control of these components and signal and data exchange with the individual components.

The control section 31 performs a role as a processing unit that executes various kinds of processing necessary for image formation by the image forming apparatus 10. Furthermore, based on the detection signal outputted from the touch panel 23 or operation on the physical keys of the operation unit 22, the control section 31 accepts an operation instruction inputted by the user.

The control section 31 has a function of controlling display operation of the display 21. The control section 31 also has a function of controlling communication operation of the network communication unit 24 and the near field communication unit 25.

The screenshot executing section 35 acquires an image being displayed on the screen of the display 21 and stores the image in the storage unit 28. In short, the screenshot executing section 35 executes a so-called screenshot taking.

In the image forming apparatus 10 having the configurations as described above, the control section 31 executes various processing in accordance with user operation on the operation unit 22 or on the touch panel 23. The control section 31 retrieves from the storage unit 28 a graphic user interface (GUI) for setting details of such processing, causes the display 21 to display the GUI, retrieves various data from the storage unit 28, and causes the display 21 to display the data.

When the user operates a screenshot key (one of the physical keys) of the operation unit 22 while the GUI and the various data (images) are being displayed on the display 21, the control section 31 accepts the user operation on the screenshot key and the screenshot executing section 35 acquires the image being displayed on the screen of the display 21, and stores the image in the storage unit 28.

As one of the aforementioned images, there is an image having been set not to be displayed on the screen of the display 21 unless the control section 31 authenticates the identification information ID of the user. Examples of this type of image include a mail address book, the IP address of the image forming apparatus 10, and data classified as confidential.

Figure 3:
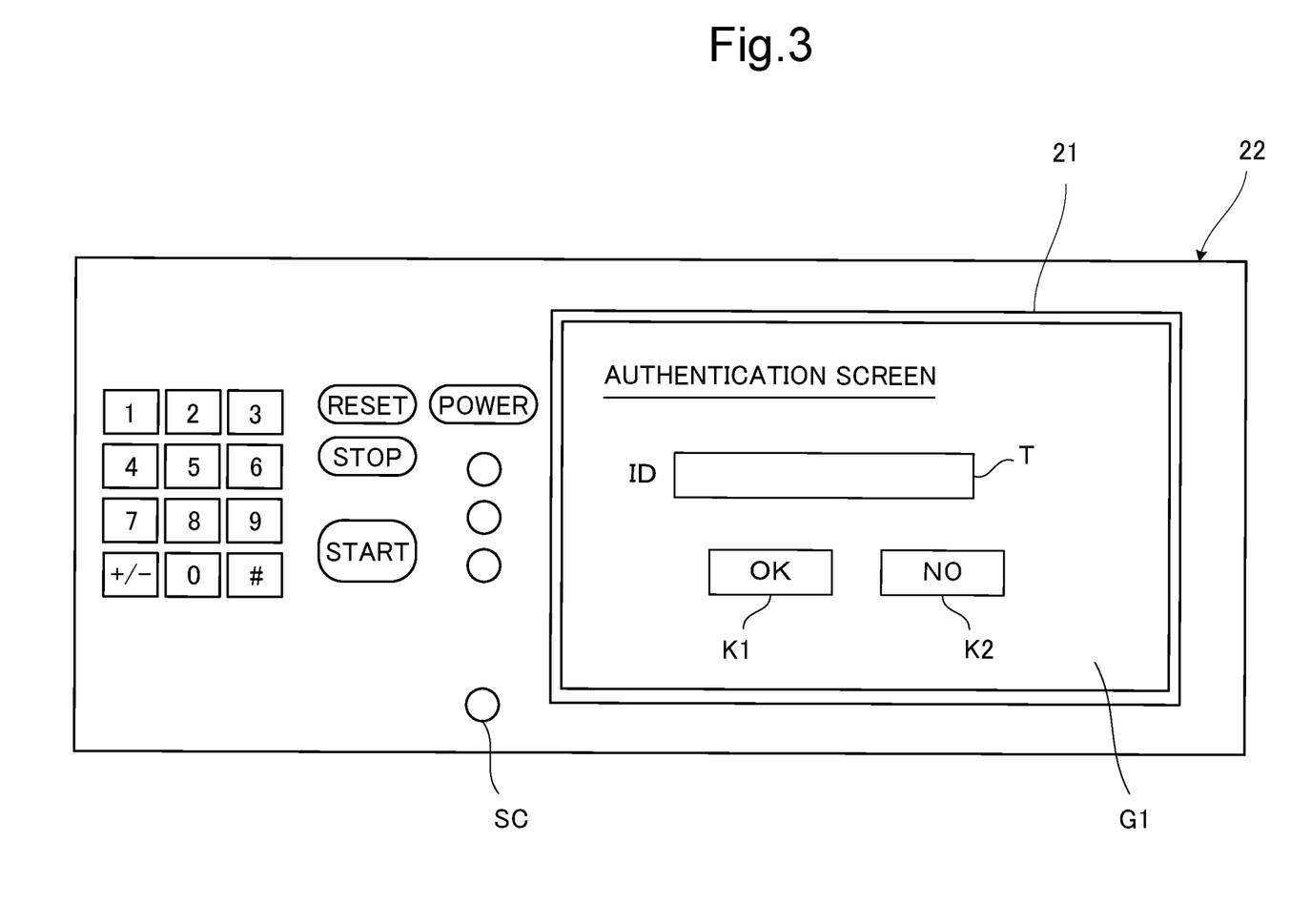
FIG. 3 is a view showing an authentication screen displayed on a display of the image forming apparatus.

For example, when the user operates the operation unit 22 or the touch panel 23 to input an instruction requesting such image requiring authentication of the identification information ID of the user (i.e., user authentication), the control section 31 follows the instruction and causes the display 21 to display an authentication screen G1 (an example is shown in FIG. 3) for inputting the identification information ID of the user. The authentication screen G1 includes a text box T for inputting the identification information ID of the user, an OK key K1, and a NO key K2 displayed thereon.

The user operates the operation unit 22 or the touch panel 23, inputs his/her identification information ID into the text box T, then touches the OK key K1. Upon receiving the touch operation performed on the OK key K1 through the touch panel 23, the control section 31 determines whether the identification information ID inputted into the text box T matches with the identification information ID previously associated with the image instructed to be displayed. Upon determining that these two pieces of the identification information ID match, the control section 31 approves the identification information ID inputted into the text box T (i.e., approves the user), permits the display of the image, then causes the display 21 to display the image.

Upon determining that the identification information ID inputted into the text box T on the authentication screen G1 matches with the identification information ID of a power user (such as an administrator) previously stored in the storage unit 28, the control section 31 not only authenticates the identification information ID of the power user inputted into the text box T and permits the display of the image that requires authentication of the identification information ID of the user, but also permits taking of a screenshot. Therefore, the power user is capable of displaying the image that premises the authentication of the identification information ID of the user on the display 21 and acquiring the image by taking a screenshot.

Instead of causing the display 21 to display the authentication screen G1 at a timing when the display of the image that requires authentication of the identification information ID of the user when being displayed on the display 21 is instructed, and authenticating the identification information ID of the user inputted into the authentication screen G1, the control section 31 may be configured to cause the display 21 to display the authentication screen G1 at a timing before the display of the image is instructed, and to authenticate the identification information ID of the user. For example, when causing the authentication screen G1 to be displayed at the start of using the image forming apparatus 10 and authenticating the identification information ID of the user inputted into the authentication screen G1 (login authentication) are set, the control section 31, at any time after approving the identification information ID of the user, permits the display of the image that requires authentication of the identification information ID of the user when being displayed on the display 21. In this case, for the general user, the control section 31 forbids taking of the screenshot of the image and for the power user, the control section 31 permits taking of the screenshot of the image.

Figure 4:
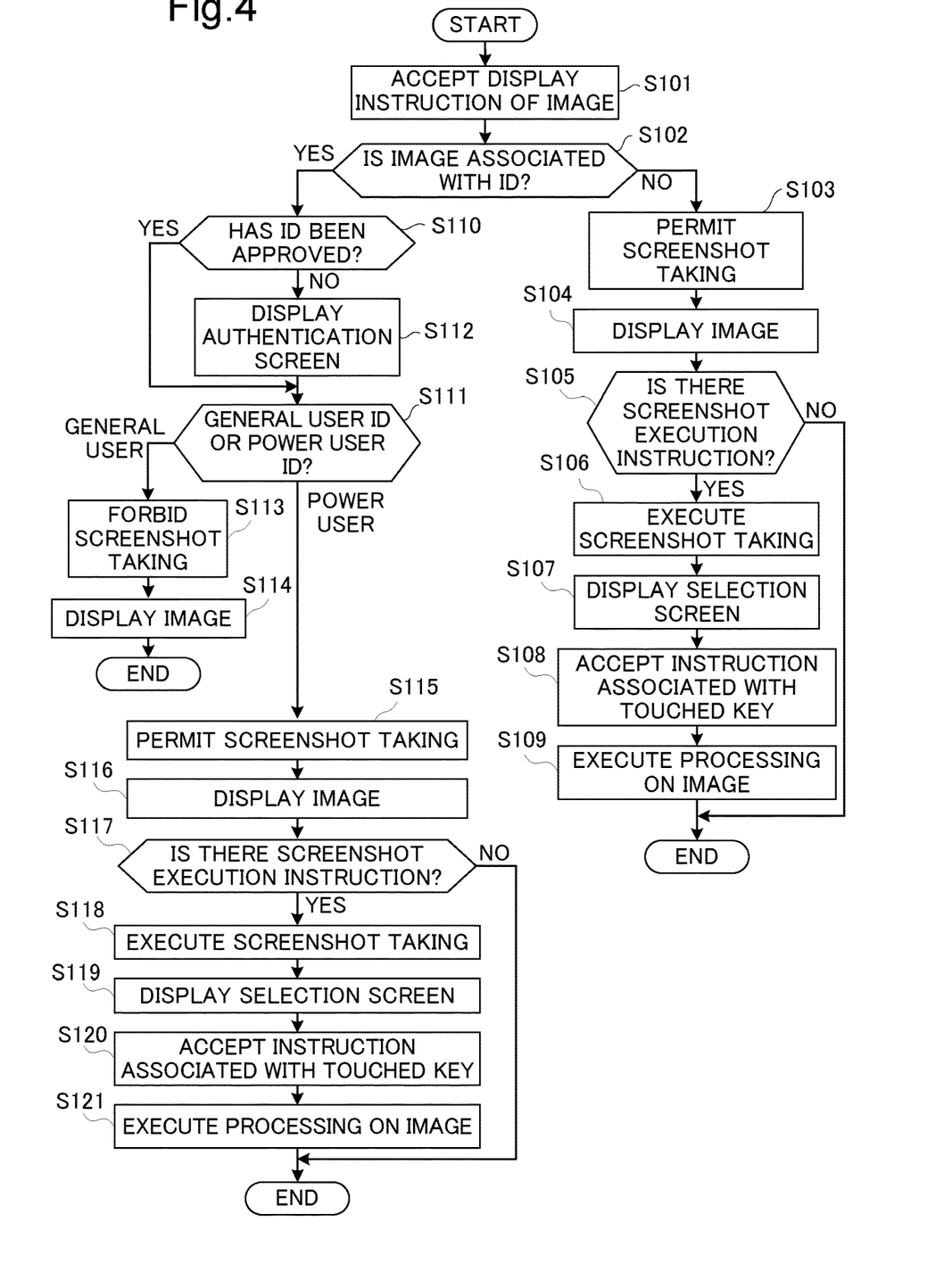
FIG. 4 is a flowchart showing procedures for displaying an image that premises authentication of identification information ID of a user and for acquiring of an image by screenshot taking.

Next, with reference to the flowchart shown in FIG. 4, a detail description will be given to procedures for: displaying the image that premises the authentication of the identification information ID of the user when being displayed on the display 21 as described above; and acquiring the image captured by taking a screenshot.

Figure 5:
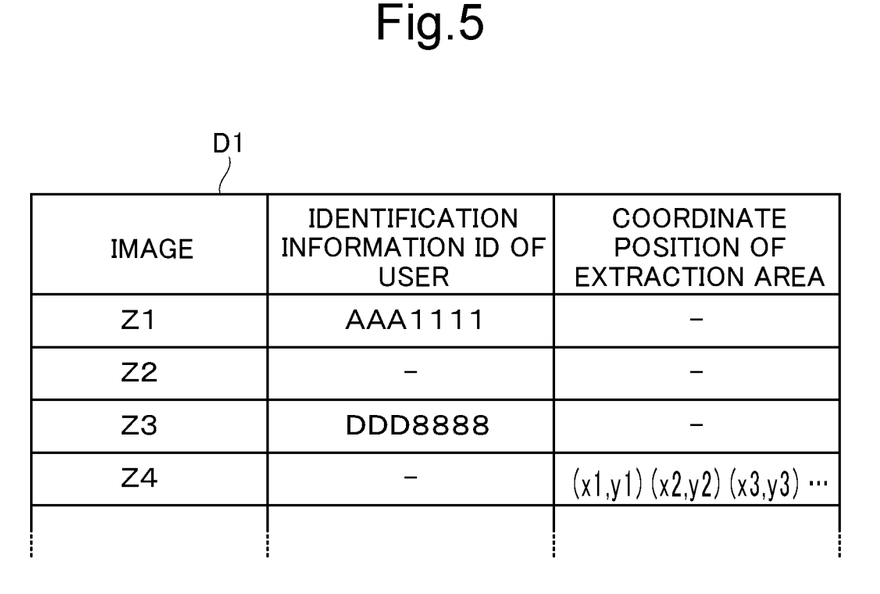
FIG. 5 is a diagram conceptually showing a data table that represents an association between each of a plurality of images and each identification information ID of the user.

When the user operates the operation unit 22 or the touch panel 23 to input a display instruction requesting the display of the GUI or various data (images), which are to be displayed on the screen of the display 21, the control section 31 accepts the display instruction (S101) and determines whether the identification information ID of the user is previously associated with the image (i.e., whether the authentication of the identification information ID of the user is required when being displayed on the display 21) (S102). For example, the storage unit 28 stores a data table D1 as shown in FIG. 5: the data table D1 shows the association between the image and the identification information ID of the user, for each of a plurality of images Z1, Z2, and so on displayed on the screen of the display 21. As shown in the data table D1, each of a plurality of images Z1, Z2, and so on is set with whether or not associated with the identification information ID of the user.

Figure 6:
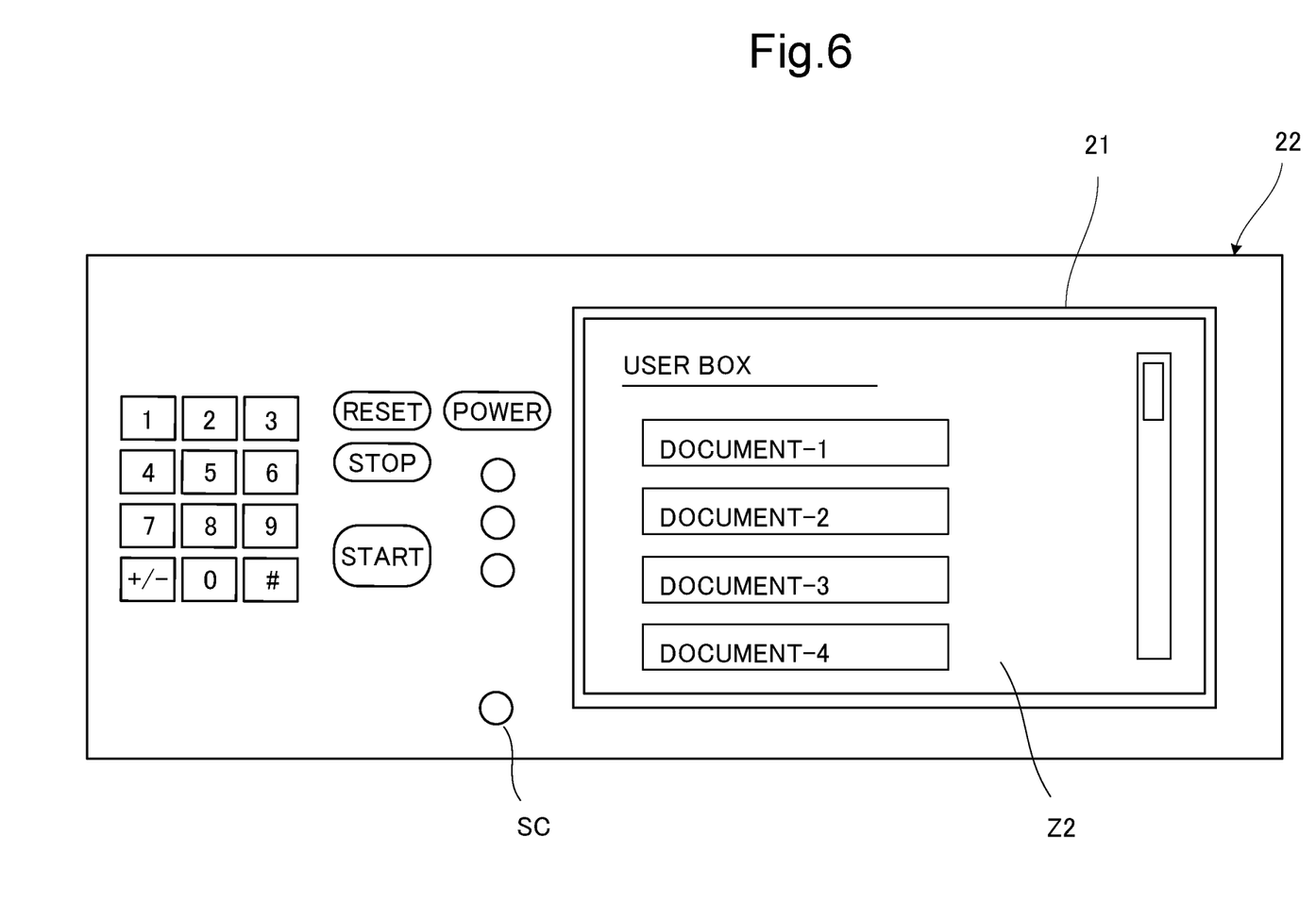
FIG. 6 is a view showing an example of an image displayed on the display.

Upon determining, by referring to the data table D1 stored in the storage unit 28, that the identification information ID of the user is not associated with the image instructed to be displayed (i.e., the authentication of the identification information ID of the user is not required when being displayed on the display 21) ("NO" in S102), the control section 31 performs processing of permitting taking of the screenshot (S103), retrieves the image form the storage unit 28, and causes the display 21 to display the image (S104). The control section 31 causes the display 21 to display an image Z2 as shown in FIG. 6 for example. The operation unit 22 is provided with a screenshot key SC (one of the physical keys).

Thereafter, the control section 31 waits for the user to operate the screenshot key SC of the operation unit 22 to input a screenshot executing instruction (S105). For example, when no screenshot executing instruction is inputted but a different processing is instructed ("NO" in S105), the control section 31 temporarily terminates the processing shown in FIG. 4. In this case, the control section 31 executes the different processing.

Figure 7:
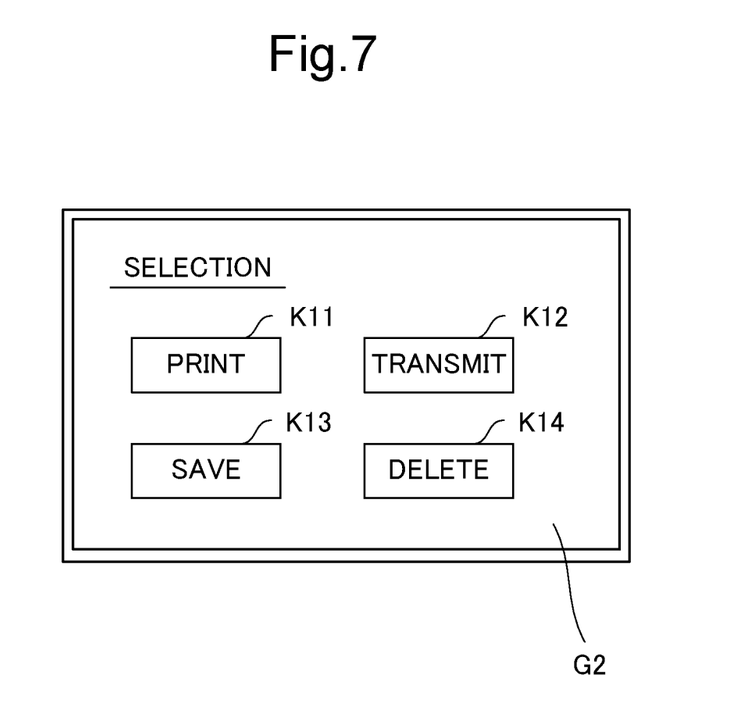
FIG. 7 is a view showing a selection screen displayed on the display and to be used to select processing of an image acquired by taking a screenshot.

When the screenshot executing instruction is inputted ("YES" in S105), the control section 31 accepts the screenshot executing instruction based on the permission to take the screenshot given in the step S103. The screenshot executing section 35 acquires the image being displayed on the screen of the display 21 at this point, and stores the image in the storage unit 28 (S106). Then, the control section 31 switches the display from the image being displayed on the screen of the display 21 at this point and causes the display 21 to display a selection screen G2 for selecting the processing of the image acquired by taking the screenshot (S107) (an example is shown in FIG. 7). The control section 31 establishes short-range communication with the mobile terminal device 40 (see FIG. 2) belonging to the user near the image forming apparatus via the near field communication unit 25.

On the selection screen G2 shown in FIG. 7, a print key K11 for instructing printing of the image acquired by taking the screenshot, a transmission key K12 for instructing transmission of the image, a save key K13 for instructing saving of the image, a delete key K14 for instructing deleting of the image are displayed. When the user touches any one of the keys K11 to K14, the control section 31 accepts through the touch panel 23 the instruction associated with the one touched key (S108), and executes the processing corresponding to the instruction (S109). The processing ends afterwards.

For example, when the user touches the print key K11, the control section 31 accepts through the touch panel 23 a print instruction associated with the print key K11 (S108), controls the image forming unit 12 to cause the image forming unit 12 to form the image acquired on a recording sheet (S109).

Also, when the user touches the transmission key K12, the control section 31 accepts through the touch panel 23 a transmission instruction associated with the transmission key K12 (S108), then, the control section 31 causes the near field communication unit 25 to transmit the image acquired in the step S106 (S109). The image is immediately transmitted to the mobile terminal device 40 since near field communication is established with the mobile terminal device 40 of the user via the near field communication unit 25 as described above.

When the screenshot executing section 35 acquires the image being displayed on the screen of the display 21 and stores the image in the storage unit 28 as described above, the control section 31 determines whether the image includes the image representing a predetermined item. When the image includes the image representing the predetermined item, the control section 31 may be configured to extract only the image representing the predetermined item to cause the near field communication unit 25 to transmit the image extracted or to cause the image forming unit 12 to print the image extracted.

Figure 8:
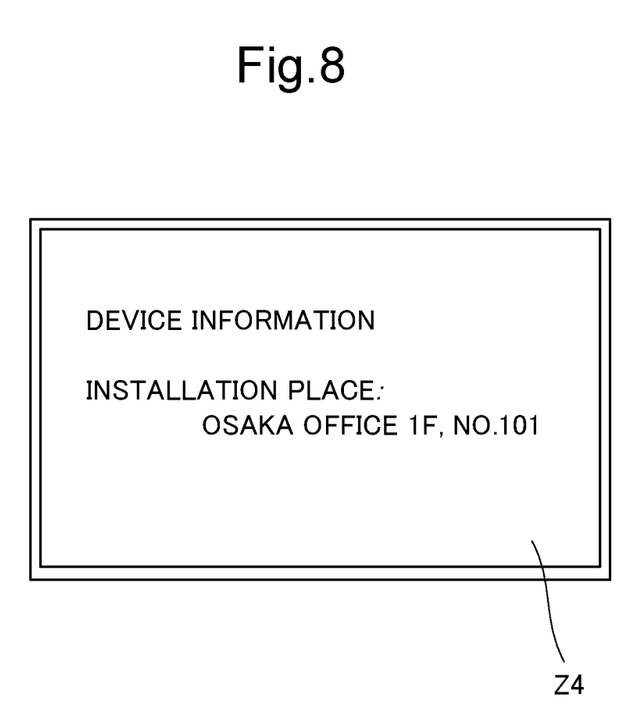
FIG. 8 is a view showing an example of another image displayed on the display.

For example, when an image Z4 as shown in FIG. 8 is acquired by taking the screenshot and a coordinate position of an extraction area is registered on the data table D1 in association with the image Z4 shown in FIG. 5, the control section 31 refers to the coordinate position to extract, as the image representing the predetermined item, the extraction area (for example, the image portion representing "installation place: Osaka office 1F, No. 101") from the image Z4, then causes the near field communication unit 25 to transmit the image in the extraction area. The control section 31 may be configured to convert the extracted image portion into a text using an incorporated optical character recognition (OCR) function i.e., by performing an OCR processing (stated differently, the control section 31 may be configured to extract as a text the character image appeared on the image portion), and to cause the near field communication unit 25 to transmit the text to the mobile terminal device 40.

Furthermore, when the user touches the save key K13, the control section 31 accepts through the touch panel 23 a save instruction associated with the save key K13 (S108) and saves the image stored in the storage unit 28 as it is (S109).

Furthermore, when the user touches the delete key K14, the control section 31 accepts through the touch panel 23 a delete instruction associated with the delete key K14 (S108) and deletes the image stored in the storage unit 28 (S109).

On the other hand, upon determining, by referring to the data table D1 stored in the storage unit 28, that the identification information ID of the user is associated with the image instructed to be displayed in the step S101 (i.e., the authentication of the identification information ID of the user is required when being displayed on the display 21) ("YES" in S102), the control section 31 determines whether the identification information ID of the general user or the identification information ID of the power user has already been approved (110).

For example, at the start of using the image forming apparatus 10, when the identification information ID of the general user or the identification information ID of the user of the power user, which is previously associated with the image instructed in S101, is being authenticated (login authentication) and being approved, the control section 31 determines that the identification information ID of the general user or the identification information ID of the user of the power user is being approved ("YES" in S110), and determines that which of the identification information ID of the general user and the identification information ID of the power user is being approved (S111).

Upon determining that no approval is being given to the identification information ID of the general user or the identification information ID of the user of the power user, which is previously associated with the image instructed in S101 ("NO" in S110), the control section 31 causes the display 21 to display the authentication screen G1 (an example is shown in FIG. 3) (S112). The general user or the power user operates the operation unit 22 or the touch panel 23 to input his/her identification information ID into the text box T, then touches the OK key K1. Upon accepting through the touch panel 23 an authentication instruction associated with the OK key K1, the control section 31 determines, by referring to the data table D1 stored in the storage unit 28, whether the identification information ID inputted into the text box T matches with the identification information ID of the general user previously associated with the image instructed in S101 or whether the identification information ID inputted into the text box T matches with the identification information ID of the power user previously associated with the image instructed in S101, to thereby determine that which of the identification information ID of the general user and the identification information ID of the power user is being approved (S111).

When the control section 31 determines that the identification information ID inputted into the text box T matches with neither the identification information ID of the general user previously associated with the image instructed in S101 nor that of the power user previously associated with the image instructed in S101, the control section 31 avoids the display of the image on the display 21. In this case, the processing shown in FIG. 4 ends at this point.

In the step S111, when the control section 31 determines that the identification information ID of the general user previously associated with the image instructed in S101 has been approved ("GENERAL USER" in S111), the control section 31 executes processing to forbid the screenshot executing section 35 to take the screenshot (S113), so that displaying of the image instructed in S101 on the display 21 (S114) is only performed.

Figure 9:
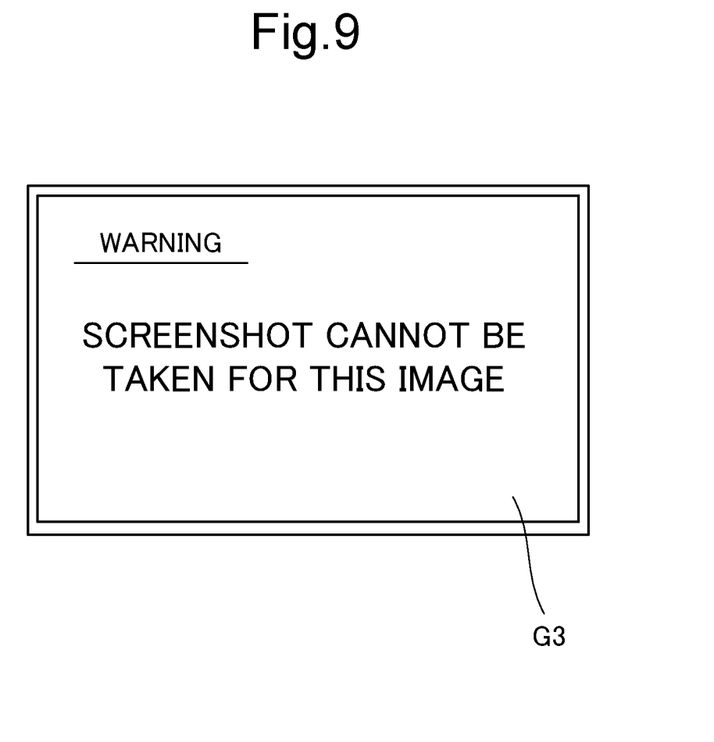
FIG. 9 is a view showing a warning screen displayed on the display.

In displaying the image, even if the screenshot key SC is operated, the control section 31 does not accept the screenshot executing instruction and does not allow the screenshot executing section 35 to acquire the image because taking of the screenshot has been forbad in the step S113. If the screenshot executing instruction is inputted, the control section 31 causes the display 21 to display a warning screen G3 (an example is shown in FIG. 9). Thus, when the identification information ID of the general user has been approved, the taking of the screenshot of the image displayed on the display 21 is forbidden.

Upon determining in the step S111 that the identification information ID of the power user is authenticated ("POWER USER" in S111), the control section 31 executes processing to permit the screenshot executing section 35 to take the screenshot (S115) and causes the display 21 to display the image instructed in S101 (S116).

Then, the control section 31 waits for the screenshot executing instruction to be inputted from the operation unit 22 (S117). For example, when no screenshot executing instruction is inputted but a different processing is instructed ("NO" in S117), the control section 31 temporarily terminates the processing shown in FIG. 4. In this case, the control section 31 executes the different processing.

When the screenshot executing instruction is inputted ("YES" in S117), the control section 31 accepts the screenshot executing instruction because taking of the screenshot has been permitted in the step S115. The screenshot executing section 35 acquires the image being displayed on the screen of the display 21, and stores the image in the storage unit 28, i.e., executes taking of the screenshot (S118). In this case, the control section 31 causes the display 21 to display a selection screen G4 (an example is shown in FIG. 10) related to processing the image acquired by taking the screenshot (S119).

Figure 10:
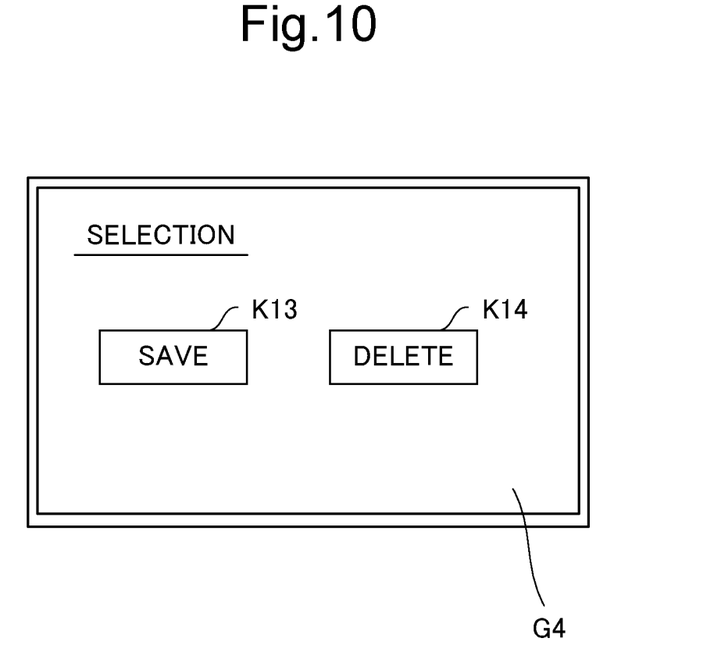
FIG. 10 is a view showing another selection screen displayed on the display and to be used to select processing of the image acquired by taking the screenshot.

On the selection screen G4 shown in FIG. 10, a save key K13 for instructing saving of the image acquired by taking the screenshot and a delete key K14 for instructing deleting of the image are displayed. When the power user touches the save key K13 or the delete key K14, the control section 31 accepts through the touch panel 23 the instruction associated with the key having been touched (S120), and executes the processing corresponding to the instruction (S121).

For example, when the power user touches the save key K13, the control section 31 accepts through the touch panel 23 the save instruction associated with the save key K13 (S120) and save the image stored in the storage unit 28 as it is (S121). When the power user touches the delete key K14, the control section 31 accepts through the touch panel 23 the delete instruction associated with the delete key K14 (S120) and deletes the image stored in the storage unit 28 (S121).

Thus, though taking of the screenshot of the image displayed on the display 21 on the premise of the authentication of the identification information ID is permitted when the identification information ID of the power user is authenticated, it is prohibited to print and transmit the image: it is only permitted to save or delete the image acquired by taking the screenshot. Such the forbidding of the printing and transmission of the image maintains the security of the image. In other words, in approving the power user and permitting the screenshot executing section 35 to acquire the image, the control section 31 limits the execution to the processing determined in advance with respect to the image acquired and only permits the execution to the limited processing.

As described thus far, in the present embodiment, when the image previously associated with the identification information ID of the user is being displayed on the screen of the display 21, taking of a screenshot is restricted. When the image not associated with the identification information ID of the user is being displayed, taking of a screenshot is permitted, and furthermore, it is permitted to print, transmit, save, and delete the image acquired by taking the screenshot. As for the power user, taking a screenshot of the image previously associated with the identification information ID of the user is permitted, and the image acquired by taking the screenshot can be saved and deleted only. This can precisely restrict acquiring of an image captured by taking a screenshot and it is possible to prevent the leakage of personal information.

In an electronic apparatus shared by multiple users, it is necessary to protect personal information belongs to each user, so that when the electronic apparatus has the above-described function of screenshot taking, if the function of screenshot taking is abused, leakage of personal information may be caused. Still, the function of screenshot taking is highly convenient, so it is not desirable to abolish or prohibit the feature.

Whereas the present embodiment is capable of precisely restricting the acquiring of an image captured by taking a screenshot and it is possible to prevent the leakage of personal information.

In above embodiment, when the control section 31 approves the power user and permits the screenshot executing section 35 to take a screenshot, the control section 31 restricts the execution of the processing to the above-mentioned predetermined processing. Alternatively, the control section 31 may be configured to permit execution of all the processing without the aforesaid restriction similarly to the above described steps S107 to S109. In this case, as for the general user, the control section 31 permits the screenshot executing section 35 to acquire the image when approving the general user in the step S111. As for the acquired image, however, the restriction may be given and only the processing determined in advance may be permitted to be executed.

In the embodiment described above, when the image that requires authentication of the user when being displayed on the display 21 is being displayed on the display 21, the control section 31 permits the screenshot executing section 35 to acquire the image upon approving the power user. Alternatively, when the image that requires authentication of the user (including the power user) when being displayed on the display 21 is being displayed on the display 21, the control section 31 may be configured to forbid the screenshot executing section 35 to acquire the image for all users regardless of general users and power users.

In other words, in the above, when the image that requires authentication of the identification information ID of the user (including the power user) is being displayed on the display 21, even if the user operates the screenshot key of the operation unit 22 to input the screenshot executing instruction, the control section 31 dose not accepts the screenshot executing instruction, and the operation, in which the screenshot executing section 35 acquires the image being displayed on the screen of the display 21 and stores the image in the storage unit 28, is not performed. For the image displayed on the display 21 on the premise of the authentication of the identification information ID of the user, taking of a screenshot is forbidden.

Although the description of the above embodiments is given taking an image forming apparatus as an example of the electronic apparatus according to the present disclosure, the example is merely illustrative and the electronic apparatus may be, for example, a personal computer and a medical equipment that are shared by multiple users. It should be noted that the electronic device of the above embodiment corresponds to the configuration excluding the image reading unit 11 and the image forming unit 12 from the image forming apparatus 10 shown in FIG. 2.

The configurations and processing shown in the above embodiment with reference to FIGS. 1 to 10 are merely illustrative of the present disclosure and not intended to limit the present disclosure to the above particular configurations and processing.

While the present disclosure has been described in detail with reference to the embodiments thereof, it would be apparent to those skilled in the art the various changes and modifications may be made therein within the scope defined by the appended claims.

What is claimed is:

1. An electronic device comprising:
   a display; and
   a control unit including a processor and functioning, when the processor executes a control program, as:
   a screenshot executing section acquiring an image being displayed on the display; and
   a control section performing authentication processing authenticating a user,
   wherein when an image that requires authentication of the user is being displayed on the display, the control section: (i) in a situation of approving through the authentication processing a power user determined in advance and causing the display to display the image, permits the screenshot executing section to acquire the image, permits only saving or deleting, both is processing predetermined for the image acquired, and forbids printing and transmitting, both is processing other than the processing predetermined for the image acquired; and (ii) in a situation of approving through the authentication processing a general user other than the power user and causing the display to display the image, forbids the screenshot executing section to acquire the image, and
   when an image that requires no authentication of the user is being displayed on the display, the control section permits the screenshot executing section to acquire the image and permits executing saving, deleting, printing, or transmitting of the image acquired.

2. The electronic device according to claim 1, wherein
   in the situation of approving through the authentication processing the power user and causing the display to display the image that requires the authentication of the user, when the acquiring of the image by the screenshot executing section is executed, the control section causes the display to display a selection screen including a save key for instructing saving of the image acquired and a delete key for instructing deleting of the image, and
   when the save key displayed on the display is touched, the control section executes saving of the image, and when the delete key displayed on the display is touched, the control section executes deleting of the image.

3. The electronic device according to claim 1, wherein when the screenshot executing section acquires the image being displayed on the display, requiring the authentication of the user, and including a predetermined item, the control section executes an instructed processing only on a image portion representing the predetermined item.

4. The electronic device according to claim 3, wherein when the screenshot executing section acquires the image being displayed on the display, requiring the authentication of the user, and including a predetermined item, the control section extracts only an image portion representing the predetermined item, converts the image portion extracted, through optical character recognition processing performed on the image portion extracted, into a text, and executes the instructed processing on the text.

5. The electronic device according to claim 1,
further comprising a communication unit performing data communication with an external terminal device, the communication unit being a communication interface having a communication module, wherein
after permitting the screenshot executing section to acquire the image, the control section causes the communication unit to transmit the image acquired by the screenshot executing section.

6. An image forming apparatus comprising:
the electronic device according to claim 1; and
an image forming unit including a photosensitive drum, an intermediate transfer belt, and a fixing device, and performing image formation on a recording sheet,
wherein the control section causes the image forming unit to form the image acquired by the screenshot executing section on the recording sheet.

* * * * *